(12) United States Patent
Ogura

(10) Patent No.: US 9,162,433 B2
(45) Date of Patent: Oct. 20, 2015

(54) METHOD OF PRODUCING FLOW PASSAGE DEVICE AND FLOW PASSAGE DEVICE

(71) Applicant: CANON KABUSHIKI KAISHA, Tokyo (JP)

(72) Inventor: Masaya Ogura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/495,769

(22) Filed: Sep. 24, 2014

(65) Prior Publication Data

US 2015/0086444 A1 Mar. 26, 2015

(30) Foreign Application Priority Data

Sep. 26, 2013 (JP) .................................. 2013-199505

(51) Int. Cl.
| | | |
|---|---|---|
| *G01N 15/06* | (2006.01) | |
| *G01N 33/00* | (2006.01) | |
| *G01N 33/48* | (2006.01) | |
| *B32B 37/30* | (2006.01) | |
| *B01L 3/00* | (2006.01) | |
| *B32B 37/12* | (2006.01) | |
| *B32B 37/18* | (2006.01) | |
| *B29C 65/00* | (2006.01) | |

(52) U.S. Cl.
CPC ........... *B32B 37/30* (2013.01); *B01L 3/502707* (2013.01); *B29C 65/00* (2013.01); *B32B 37/12* (2013.01); *B32B 37/18* (2013.01); *B01L 2200/025* (2013.01); *B01L 2200/0689* (2013.01); *B01L 2300/0816* (2013.01); *B01L 2300/0874* (2013.01); *B01L 2300/0887* (2013.01)

(58) Field of Classification Search
CPC ........ G01N 15/06; G01N 33/00; G01N 33/48
USPC .................................. 422/501, 502, 503, 68.1
See application file for complete search history.

(56) References Cited

U.S. PATENT DOCUMENTS

| | | | | |
|---|---|---|---|---|
| 6,653,124 | B1 * | 11/2003 | Freeman | 435/297.1 |
| 8,053,239 | B2 * | 11/2011 | Wheeler et al. | 436/15 |
| 8,187,864 | B2 * | 5/2012 | Wheeler et al. | 435/287.1 |
| 8,647,465 | B2 * | 2/2014 | Chartier et al. | 156/292 |

FOREIGN PATENT DOCUMENTS

JP        2012-168115 A        9/2012

* cited by examiner

*Primary Examiner* — Brian J Sines
(74) *Attorney, Agent, or Firm* — Canon U.S.A., Inc. IP Division

(57) ABSTRACT

A flow passage device includes a first base body having a first hole and a second base body having a second hole connected to the first hole to form a flow passage. A first portion formed around the first hole has a specified shape for holding an adhesive. The second base body has a high-wettability surface around the second hole with a low-wettability surface disposed proximate the high-wettability surface, and at least part of the high-wettability surface has a shape matching at least part of the specified shape. The first and second base body are bonded to each other with the adhesive to form the flow passage by aligning the at least part of the first portion with the at least part of the high-wettability surface with positions of the first and the second holes aligned with each other.

13 Claims, 4 Drawing Sheets

METHOD OF PRODUCING FLOW PASSAGE DEVICE AND FLOW PASSAGE DEVICE

BACKGROUND

1. Field

The present disclosure relates to flow passage devices such as microchannels, which are usable for applications where chemical reactions are a main mechanism for analyses, and relates to a method of producing the flow passage devices. For example, the present disclosure relates to a technology relating to the flow passage device such as a medical microchannel used in genetic tests, protein tests, and so forth.

2. Description of the Related Art

In existing sample tests, fluid reagents are required for chemical analyses, preparation of reagents, chemical syntheses, and reaction detection on the order of milliliters (ml) to microliters (μl). Tests performed using test-tubes or the like can now be performed on the order of nanoliters (nl) by formation of a fine reaction field using a litho-process and a thick film process techniques. The micro total analysis system (μ-TAS) is a technology used for medical tests and diagnoses performed by utilizing such fine reaction fields. That is, the μ-TAS technology is applicable to fields of genetic testing, chromosomal testing, cell testing and so forth, biotechnologies, tests of substances present in very small amounts in the environment, research on the cultivating environment for agricultural products and the like, genetic tests of agricultural products, and so forth.

Existing tests are mainly performed by laboratory technicians who have skills for handling reagents. However, the test processes are complex, and a certain skill levels are required to operate the equipment. In such a technical situation, introduction of the μ-TAS technology has been attracting attention as a significantly advantageous method. The advantages include automatization, increased speed, increased accuracy, cost reduction, promptness, decreased negative effects on the environment, and so forth. Microchannels (flow passages) used for such a μ-TAS technology have fine grooves and holes for introducing the reagents into the grooves. In order to achieve effective reactions of a reagent with a small amount of a sample, a small amount of the reagent needs to be handled without problem. Regarding such a technology, a microchannel has been proposed. With this microchannel, introduction of air bubbles into a flow passage, through which a small amount of a liquid flows, can be avoided (see Japanese Patent Laid-Open No. 2012-168115).

More particularly, as the advanced medical testing systems as described above are generally used, microchannels utilized in the medical testing systems need to be produced. Typical microchannels have flow passages (grooves) as closed spaces and holes for introduction of the reagents into the flow passages. Although the microchannels having fine structures have fine flow passages and holes for handling of the reagents in the structures, the amounts of the reagents are in a different order from the amounts of the reagents used in the existing testing. Thus, there are some difficulties in the production of such flow passages. One of the difficulties is as follows: when a hole formed in a component is connected to a hole formed in another component, the reagent is transferred through the connected holes. However, joining the holes having a fine opening is not an easy task. For example, assuming that the reagent is transferred through holes having about 1-mm openings connected to each other. In this case, when positioning is not accurately performed, the centers of the holes are misaligned with each other. This may lead to formation of a step or a small space due to incomplete engagement of the peripheral portions. This step or small space may cause the opening area of the flow passage to vary, disturb the flow of the reagent in the flow passage, or cause contamination while changing the reagent. In order to address the difficulties, the following structure has been attempted: the diameters of the fine openings are designed to be slightly different from each other and the steps and the small spaces designed in advance are maintained. However, even with this structure, it is not easy to connect the holes with the alignment of the holes completely maintained.

SUMMARY

A flow passage device according to an aspect disclosed herein includes a first base body having a first hole and a second base body having a second hole connected to the first hole to form a flow passage. That is, the first base body has a first portion around the first hole. The first portion has a specified shape for holding an adhesive. The second base body has a high-wettability surface around the second hole with a low-wettability surface disposed proximate the high-wettability surface, and at least part of the high-wettability surface is patterned to have a shape that matches at least part of the specified shape of the first portion of the first base body. The first base body and the second base body are bonded to each other with the adhesive to form the flow passage by aligning the at least part of the first portion with the at least part of the high-wettability surface with a position of the first hole aligned with a position of the second hole.

According to a second aspect of the present disclosure, a method of producing a flow passage device, which includes a first base body having a first hole and a second base body having a second hole connected to the first hole to form a flow passage. The method includes the step of preparing the first base body that has a first portion around the first hole. The first portion has a specified shape for holding an adhesive. The method also includes the step of preparing the second base body that has a high-wettability surface around the second hole with a low-wettability surface disposed proximate the high-wettability surface. At least part of the high-wettability surface is patterned to have a shape that matches at least part of the specified shape of the first portion of the first base body. The method also includes the step of holding the adhesive in the first portion for holding the adhesive. The method also includes the step of forming the flow passage by causing the first base body and the second base body to oppose each other with positions of the first hole and the second hole aligned with each other by aligning the first portion for holding the adhesive with the high-wettability surface in a specified form.

According to the present disclosure, the holes of the base bodies opposing each other can be reliably aligned with each other by utilizing the surface tension of the adhesive used for the connection. For example, a small recess (groove) is formed around the reagent introduction hole of the microchannel and the low-velocity adhesive is caused to flow into the small recess, and two types of surfaces having different wettabilities are patterned around the other reagent introduction hole. With this structure, by aligning the recess formed around the hole with the patterned surfaces having different wettabilities in the specified form while utilizing the surface tension of the adhesive, the holes of the base bodies opposing each other can be reliable aligned with each other.

Further features of the present disclosure will become apparent from the following description of exemplary embodiments with reference to the attached drawings.

DESCRIPTION OF THE EMBODIMENTS

Figure 1:
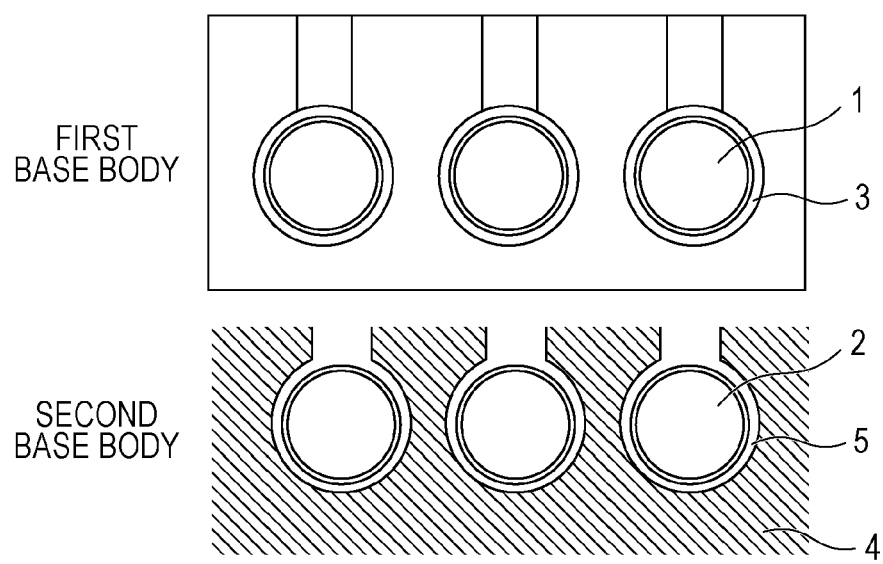
FIG. 1 is a cross-sectional view of a first base body and a second base body that each have its own holes.

According to the present disclosure, a portion of one base body holding an adhesive and a high-wettability surface of the other base body are aligned with each other in a specified form so as to align the positions of holes with one another, thereby causing both the base bodies to oppose each other to form a flow passage. Although a pattern of the high-wettability surface may completely match a pattern of the adhesive holding portion, it is sufficient that at least part of the former match at least part of the latter. It is sufficient that, when corresponding portions of both the base bodies are aligned with each other, a joining relationship in a uniquely determined state be established without misalignment of the holes. Thus, it is sufficient that the pattern of the high-wettability surface and the pattern of the adhesive holding portion have such corresponding portions, respectively. However, the relationship between such a corresponding portion and the position of the hole of the one base body needs to be the same as that of the other base body. That is, it is sufficient that, when the adhesive holding portion and the high-wettability surface are aligned with each other in the specified form, the corresponding portion of the former and the corresponding portion of the latter be aligned with each other by the surface tension of the adhesive, and as a result, a first base body and a second base body oppose each other in the uniquely determined state and the positions of the holes be aligned with one another. Thus, the shapes of the corresponding portions can be shapes with which such a uniquely determined state is achievable and can be shapes superposed with each other by a rotation of 360 degrees instead of simple circular shapes or regular polygons that are rotational symmetry, that is, superposed with each other by a rotation of less than 360 degrees. Although the adhesive holding portion is typically a fine groove, it is sufficient that the adhesive holding portion has a function of holding the adhesive. Thus, the adhesive holding portion may be a porous or spongy portion. Such a portion or a groove, which can have a continuous pattern from the viewpoint of introduction of the adhesive, may alternatively have a non-continuous pattern. According to the present disclosure, when the holes oppose each other, for example, the groove pattern opposes the patterns having different wettabilities. That is, when the adhesive of a low viscosity is caused to flow into the groove, the adhesive is distributed in the groove by utilizing the surface tension. In this state, when the base body having the surfaces patterned so as to have different wettabilities and the base body with the groove are brought together, the low-velocity adhesive tends to attract the high-wettability patterned portion and pushes away the low-wettability patterned portion. Thus, the adhesive itself causes the hole positions to be aligned with each other. In this state, by radiating energy (for example, ultraviolet ray) to cure the adhesive, both the base bodies are bonded to each other.

First Embodiment

A first embodiment of a microchannel, which is a flow passage device according to the present disclosure, is described. Here, the microchannels generally refer to fine flow passage devices used in medical testing and diagnoses represented by μ-TASs. Other examples of the microchannels include DNA chips, Labs-on-a-Chip, micro-arrays, and protein chips. In the present embodiment, the structure and a method of producing a microchannel, which has fine flow passages into which a reagent is introduced for analytical inspection. The flow passages are generally formed by bonding a flat sheet to a glass or plastic structure, which has grooves formed therein, by a bonding or joining technique.

In order to introduce the reagent into the flow passages, the reagent is caused to flow through fine holes (through holes), which are connected to the flow passages, by using, for example, suction. Alternatively, the reagent may be introduced into the flow passage by the surface tension of the reagent, which is a liquid, utilized by the flow passage itself instead of using an external force such as suction. Such microchannels, each of which has the flow passages and the holes connected to the flow passages, need to be joined to each other in order to transfer the reagent. Although it depends on the size of the flow passages, the size of most of the fine holes is generally within 1 mm. The flow passage device may be integrally formed or formed by bonding two or more substrates, in which the grooves of the flow passages are formed.

The material of the base bodies having the flow passages formed therein is selected from among, for example, glass, plastic, metal, and an inorganic compound.

An example of a method of connecting fine holes to one another in the case where the microchannels are connected to each other is described with reference to the drawings. The first base body is formed of a plastic. Plastic sheets are bonded to each other to form a microchannel element. The flat plastic sheet having through holes is bonded to another plastic sheet having grooves so as to form the microchannel element. The second base body is formed of glass. As is the case with the first base body, a glass sheet having through holes and another glass sheet having grooves are joined to each other so as to form the glass microchannel element. The plastic microchannel element and the glass microchannel element are bonded to each other by bonding plastic to glass with flow passages (holes) 1 and flow passages (holes) 2 formed in the respective microchannel elements caused to oppose one another.

Figure 3A:
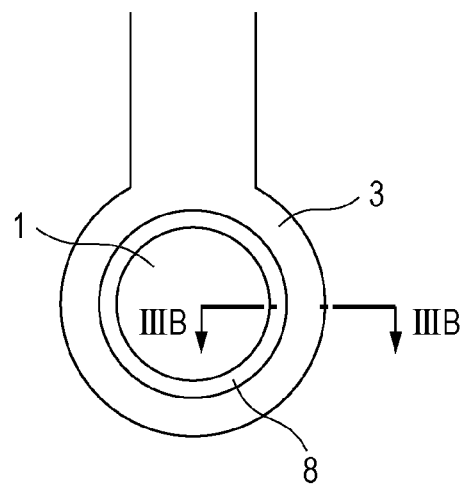
FIGS. 3A and 3B are a plan view and a sectional view near a groove of the first base body.
Figure 3B:
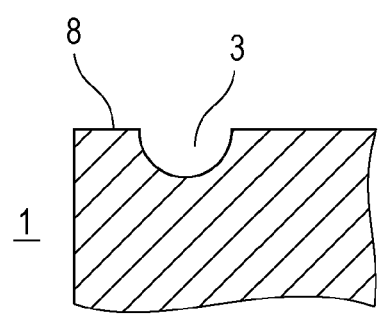

The diameter of the flow passages 1 formed in the plastic microchannel element is about 0.25 mm. Also, the glass microchannel element has the flow passages 2 having a diameter of about 0.25 mm. Fine grooves 3 having a width of 0.1 mm and a depth of about 20 μm are formed around and near the flow passages 1 of the plastic element. A very-low-velocity adhesive is caused to flow into the fine grooves 3. The adhesive is held in the fine grooves 3 with the surface tension of the adhesive itself. Here, as illustrated in FIG. 1, the grooves 3 are patterned so that each of the grooves 3 has a branch portion connected to a continuous annular portion. As illustrated in FIGS. 3A and 3B, the grooves 3 each have an annular portion around the hole 1 with a flat surface 8 interposed therebetween. The bottom surface of each of the grooves 3 is, for example, a rectangular shape, a wedge shape, and a semi-circular shape in cross section.

Figure 2:
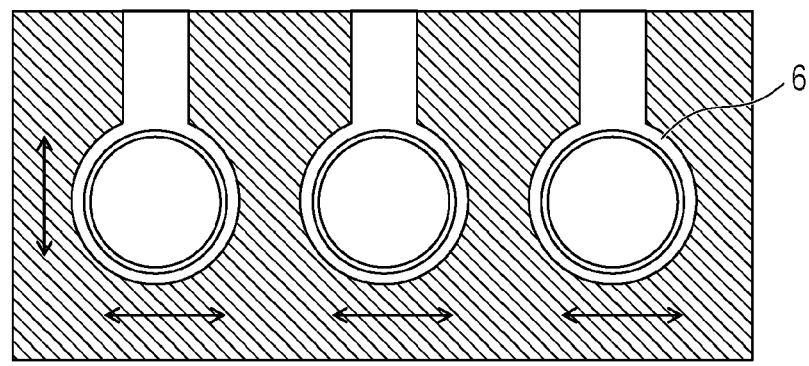
FIG. 2 is a cross sectional view of the first base body and the second base body bonded together so that the holes are connected to one another.

A surface 4 and a surface 5 are disposed around the flow passages 2 of the glass element. With respect to the adhesive, the surface 4 has hydrophobic characteristics and the surface 5 has hydrophilic characteristics. Here, the terms "hydrophilic" and "hydrophobic" are used on an assumption that the adhesive is water soluble. When the adhesive is oil-based, the terms "lipophilic" and "lipophobic" are used. In order to refer to more general concept regarding both the water and oil, the terms "high wettability" and "low wettability" is used. The hydrophilic surface 5 on the glass element side is patterned to have the same shape as that of the grooves 3 (the annular portions with the branch portions) provided around the flow passages 1 of the plastic element. The hydrophobic surface 4 is patterned so as to oppose the plastic surface except for the fine grooves 3 of the plastic element. The plastic element, in which the low-velocity adhesive has flowed into the grooves 3, is caused to oppose and bonded to the glass element, which has the hydrophilic surface 5 and the hydrophobic surface 4 patterned as described above, as follows. That is, with the surface tension of the adhesive, the hydrophilic surface 5 of the glass element is attracted and a force rejecting the hydrophobic surface 4 of the glass element acts (see "6" in FIG. 2). Thus, the pattern of the fine grooves 3 of the plastic element, into which the adhesive has flowed, is aligned with the pattern of the hydrophilic surface 5 of the glass element, and accordingly, the positions of the flow passages 1 and the flow passages 2 respectively formed in the plastic element and the glass element are aligned with one another. Here, the low-velocity adhesive is of a type cured by ultraviolet light. By radiating the ultraviolet light after the plastic element and the glass element have been caused to oppose and be aligned with each other, the adhesive is cured, and the elements can be connected to each other with the flow passages 1 and 2 aligned with one another.

Although the pattern of the grooves 3 and the pattern of the hydrophilic surface 5 completely match each other here, it is sufficient that both the patterns include respective portions, the shapes of which match each other. The high-wettability surface 5 includes annularly patterned portions around the second holes 2, and the low-wettability surface 4 is patterned inside and outside proximate the patterns of the high-wettability surfaces 5. Although the high-wettability surface 5 is surrounded by the low-wettability surface 4, the low-wettability surface 4 may be disposed at one of the outside and inside of the high-wettability surface 5. In this case, however, the self-alignment force may be slightly reduced.

When a force caused by the surface tension used for the positioning is used as an alignment force, the alignment force is given by the following equation:

$$F=\gamma*a*n$$

where $\gamma$ is the surface tension of the adhesive, a is the area in contact with the adhesive, and n is the number of holes.

In the present embodiment, the diameter of the flow passages (through holes) 1 formed in the plastic is $\phi$0.25 mm, and the annular grooves 3 having an outer diameter of $\phi$0.35 mm are formed around the flow passages 1. The grooves 3 are filled with the low-velocity adhesive. Since the glass surface itself has hydrophilic characteristics, the hydrophilic surface 5 can be used without changes. Examples of the material having hydrophobic characteristics used to form the hydrophobic surface 4 include a silicone-based thin film and porous silica material.

In the present example, a silicone-based thin film is used, and the glass surface is patterned. The surface tension of the adhesive is about 20 mN/m. When the length in contact with the interface (hydrophilic surface) around each of the through holes 2 is considered, the alignment force that acts on each of the through holes 2 is about 3.8 g. When it is assumed that the weight of the glass element is, for example, 2 g, the fine groove 3 is formed around each of ten through holes 1 of the plastic element, and the patterned hydrophobic and hydrophilic surfaces 4 and 5 are formed around each of ten through holes 2 of the glass element. With this structure, the alignment force required to correct, for example, a misalignment of about 0.1 mm acts. Thus, the patterns of the fine grooves 3 and the hydrophilic surface 5 are aligned with each other, and accordingly, the positions of the flow passages (through holes) 1 and 2 can be aligned with one another. Thus, at least one of the high-wettability and low-wettability surfaces can be fabricated by coating, evaporating, or coating and evaporating a material having a specified wettability or materials having specified wettabilities. Surface treatment may be performed by forming a thin film through coating or evaporation, or surface modification may be performed.

Second Embodiment

A second embodiment according to the present disclosure is described with reference to the drawings. Here, a first microchannel element and a second microchannel element, both of which are formed of plastic, are bonded to each other by bonding plastic to plastic with the through holes 1 and the through holes 2 formed in the respective microchannel elements caused to oppose one another. The diameter of the through holes 1 formed in the first microchannel is about 0.25 mm. The second microchannel element has the through holes 2 having a diameter of about 0.25 mm. The fine grooves 3 having a width of 0.1 mm and a depth of about 20 μm are formed around the 0.25-mm through holes 1 of the first plastic element. A very-low-velocity adhesive is caused to flow into the fine grooves 3. The adhesive is held in the fine grooves 3 with the surface tension of the adhesive itself.

The surface 5 and the surface 4 are formed around the through holes 2 of the second plastic element. The surface 5 has the hydrophilic characteristics and the surface 4 has the hydrophobic characteristics with respect to the adhesive. The pattern of the hydrophilic surface 5 includes portions around the through holes 2 having the same pattern as that of the grooves 3 of the first base body and the branch portions that each have a constant width, extend from an upper portion of a corresponding one of the portions around the through holes 2, and are open at an upper surface of the second base body. The pattern of the hydrophobic surface 4 of the second base body has portions around the through holes 2, which have the same pattern as that of the flat surface 8 disposed between the grooves 3 and the holes 1 of the first base body, and a portion outside the hydrophilic surface 5. The above-described structure is the same as that of the first embodiment.

In the present embodiment, the surface of the plastic material is formed of a hydrophobic group, thereby making the entire surface of the plastic element (second base body) have hydrophobic characteristics with respect to the adhesive. Patterning portions are formed around the through holes 2 of the plastic element with unchanged portions therebetween. The patterning portions are processed so that the surface roughness thereof is rough. By forming the rough plastic surface, the hydrophobic characteristics can be changed to the hydrophilic characteristics. The first plastic element has the fine grooves 3 around the through holes 1. In the second plastic element, portions around the through holes 2 are processed to be hydrophilic surface and patterned to have the same shape as that of the grooves 3 formed in the first plastic element. Thus, the other surface of the second plastic element having the hydrophilic characteristics is patterned so as to oppose the plastic surface other than the fine grooves 3 of the first plastic element. As described above, in the present embodiment, the surface roughness of the high-wettability surface is different from that of the low-wettability surface.

The first plastic element, in which the low-velocity adhesive has flowed into the grooves 3, is caused to oppose and bonded to the second plastic element, which has the hydrophilic surface 5 and the hydrophobic surface 4 patterned as described above, as follows. That is, with the surface tension of the adhesive, the hydrophilic surface 5 are attracted and the force in a direction rejecting the hydrophobic surface 4 acts. Thus, the pattern of the fine grooves 3 into which the adhesive has flowed is aligned with the pattern of portions of the hydrophilic surface 5 around the through holes 2, and accordingly, the positions of the through holes 1 and the through holes 2 respectively formed in the first plastic element and the second plastic element are aligned with one another. Also in this case, the low-velocity adhesive is of a type cured by ultraviolet light. By radiating the ultraviolet light after two plastic base bodies have been caused to oppose and be aligned with each other, the adhesive is cured, and both the base bodies can be connected to each other with the holes 1 and 2 aligned with one another.

When a force caused by the surface tension used for the alignment is referred to as an alignment force, the alignment force is given by the aforementioned equation. As mentioned above, the diameter of the through holes 1 formed in the first plastic element is ϕ0.25 mm. The grooves 3, which have the outer diameter of ϕ0.35 mm and are formed around each of the through holes 1, are filled with the low-velocity adhesive. The surface of the second plastic element itself has the hydrophobic characteristics. In order for a specified portions of the plastic surface to have the hydrophilic characteristics, a process is performed so that the surface roughness of the portions is about Ra=0.1 μm. The surface tension of the adhesive is about 20 mN/m. When considering the length by which the adhesive is in contact with the interface of the hydrophilic surface around each of the through holes 2, the alignment force that acts on each pair of through holes 1 and 2 is about 3.8 g.

When it is assumed that the weight of the second plastic element is, for example, 2 g, the alignment force is as follows. With ten fine grooves 3 formed around the holes 1 and ten holes 2 surrounded by the patterned hydrophobic and hydrophilic surfaces 4 and 5, the alignment force required to correct, for example, a misalignment of about 0.1 mm acts. Thus, the patterns of the fine grooves 3 and the hydrophilic surface of the hydrophilic and hydrophobic surfaces 5 and 4 are aligned with each other, and accordingly, the positions of the through holes 1 and 2 can be aligned with one another.

Other Embodiments

Although the through holes 1 and 2 have circular shapes in cross section in the examples of the first and second embodiments, the reagent introduction holes do not necessarily have a circular shape. The bottom surfaces of the fine grooves 3 formed in one of the plastic base bodies may have a rectangular shape or a wedge shape. A structural requirement is that the upper openings are patterned so as to be filled with the adhesive. As described above, as long as the pattern to be filled with the adhesive is formed in the upper surface, a porous form may be used instead of the grooves.

The features of the above-described embodiments are as follows. That is, the fine grooves are formed around the through holes of one of the plastic elements, and the pattern including hydrophilic belt-shaped portions is formed around the through holes of the other glass or plastic element so that at least the pattern of the grooves matches that of the belt-shaped portions. Furthermore, the hydrophobic pattern is formed around the hydrophilic pattern including the belt-shaped portions.

Configuration of Apparatus Using Flow Passage Device

Figure 4:
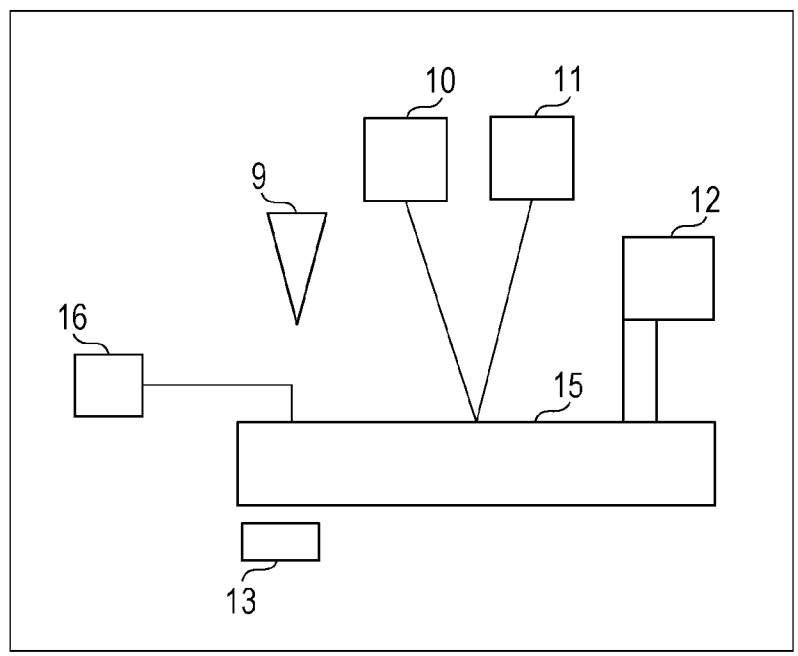
FIG. 4 illustrates a configuration of a liquid transport apparatus according to the present disclosure.

An example of an apparatus using the flow passage device of the above-described embodiments and an example of a method of transporting a liquid is described below. FIG. 4 illustrates a configuration of a liquid transport apparatus according to the present disclosure. A liquid transport apparatus 14 includes a pressure unit 12 and a liquid detecting unit 13. The pressure unit 12 generates a positive or negative pressure in a flow passage of a flow passage device 15. The liquid detecting unit 13 detects that a bottom surface of an introduction space of the flow passage device 15 is exposed. The pressure unit 12, which uses a pump unit such as a syringe pump, is connected to a discharge port of the flow passage device 15 so as to generate the pressure in the flow passage. The liquid detecting unit 13 may use an optical unit that detects reflection at the bottom surface or a unit that utilizes an electrical unit such as a resistor to detect the presence or absence of a liquid. Reference numeral 9 denotes a liquid introduction unit such as a pipet.

Reaction detecting units denoted by reference numerals 10 and 11 are a light radiating unit 10 such as a laser and a light detecting unit 11 such as a charge-coupled device (CCD). A mounting unit (not illustrated), a power unit 16, and so forth are also provided. The flow passage device 15 is mounted on the mounting unit. The power unit 16 is electrically connected to components such as a heating member provided in the flow passage device 15. A controller (computer) that controls these components may be provided in the apparatus.

A liquid is transported, for example, as follows: Initially, the flow passage device 15 is prepared. This flow passage device 15 includes the components including the flow passage, through which the liquid flows, and is produced as described in the embodiments. Next, the flow passage device 15 is set on the mounting unit of the liquid transport apparatus 14. Next, a first liquid is introduced into the introduction space of the flow passage device 15 by the liquid introduction unit 9. After that, a pressure difference is applied to the flow passage by the pressure unit 12, thereby introducing the first liquid held in the introduction space into the flow passage. As a result of continuously introducing the first liquid held in the introduction space into the flow passage, there is no longer the first liquid held in the introduction space. In order to introduce a second liquid into the introduction space for replacement, addition, or so forth of the liquid, the second liquid is introduced into the introduction space.

Then, the pressure difference is applied again to the flow passage by the pressure unit 12, thereby introducing the second liquid held in the introduction space into the flow passage.

The power unit 16 supplies power to the heating member of the flow passage device 15 so as to control the temperature of the liquid having been introduced into the flow passage. The temperature control includes, for example, application of temperature cycle for a polymerase chain reaction (PCR) and a temperature rise for thermal melting measurement. During or after the temperature control, detection of a reaction in the flow passage is performed by the reaction detecting units. As a result of the detection, whether the reaction is present or absent or the amount of the reaction is determined. This allows the reaction in the flow passage to be analyzed.

Although the embodiments of the flow passage device according to the present disclosure such as a microchannel device have been specifically described, the present disclosure is not limited to the above-described embodiments as long as an embodiment is not departing from the scope of the gist of the present disclosure.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2013-199505, filed Sep. 26, 2013, which is hereby incorporated by reference herein in its entirety.

What is claimed is:

1. A flow passage device that includes a first base body having a first hole and a second base body having a second hole connected to the first hole to form a flow passage,
wherein the first base body has a first portion around the first hole, the first portion having a specified shape for holding an adhesive,
wherein the second base body has a high-wettability surface around the second hole with a low-wettability surface disposed proximate the high-wettability surface, and at least part of the high-wettability surface is patterned to have a shape that matches at least part of the specified shape of the first portion of the first base body, and
wherein the first base body and the second base body are bonded to each other with the adhesive to form the flow passage by aligning the at least part of the first portion with the at least part of the high-wettability surface with a position of the first hole aligned with a position of the second hole.

2. The flow passage device according to claim 1,
wherein the high-wettability surface of the second base body is patterned to have a shape that includes a second portion having a shape that matches the specified shape of the first portion of the first base body.

3. The flow passage device according to claim 1,
wherein the high-wettability surface around the second hole is surrounded by the low-wettability surface.

4. The flow passage device according to claim 1,
wherein the first portion of the first base body is a groove.

5. The flow passage device according to claim 4,
wherein the groove has an annular portion around the first hole, and the annular portion is separated from the first hole by a flat surface interposed therebetween.

6. The flow passage device according to claim 4,
wherein the groove has a bottom surface having a rectangular shape, a wedge shape, or a semi-circular shape in a cross-section thereof.

7. The flow passage device according to claim 1,
wherein the adhesive is water soluble, the high-wettability surface has hydrophilic characteristics, and the low-wettability surface has hydrophobic characteristics.

8. The flow passage device according to claim 1,
wherein the adhesive is oil-based, the high-wettability surface has lipophilic characteristics, and the low-wettability surface has lipophobic characteristics.

9. The flow passage device according to claim 1,
wherein the high-wettability surface includes an annularly patterned portion around the second hole, and the low-wettability surface is disposed inside and outside the high-wettability surface by patterning.

10. The flow passage device according to claim 1,
wherein a surface roughness of the high-wettability surface is different from that of the low-wettability surface.

11. The flow passage device according to claim 1,
wherein at least one of the high-wettability surface and the low-wettability surface is created by coating, evaporating, or coating and evaporating a material having a specified wettability or materials having respective specified wettabilities.

12. The flow passage device according to claim 1,
wherein materials of the first base body and the second base body are selected from among glass, plastic, metal, and an inorganic compound.

13. The flow passage device according to claim 1,
wherein the flow passage device is configured as a microchannel device.

* * * * *